United States Patent
Worner

(10) Patent No.: US 10,316,567 B2
(45) Date of Patent: Jun. 11, 2019

(54) DRIVE FOR A DOOR OR WINDOW WING

(71) Applicant: GEZE GmbH, Leonberg (DE)

(72) Inventor: Benjamin Worner, Korntal-Munchingen (DE)

(73) Assignee: Geze GmbH, Leonberg (DE)

( * ) Notice: Subject to any disclaimer, the term of this patent is extended or adjusted under 35 U.S.C. 154(b) by 0 days.

(21) Appl. No.: 15/622,271

(22) Filed: Jun. 14, 2017

(65) Prior Publication Data
US 2017/0362872 A1    Dec. 21, 2017

(30) Foreign Application Priority Data
Jun. 15, 2016   (DE) .......................... 10 2016 210598

(51) Int. Cl.
*H02K 7/18* (2006.01)
*H02K 7/16* (2006.01)
*E05F 15/603* (2015.01)
*H02K 7/116* (2006.01)

(52) U.S. Cl.
CPC ............ *E05F 15/603* (2015.01); *H02K 7/116* (2013.01); *H02K 7/1853* (2013.01); *E05Y 2900/132* (2013.01); *E05Y 2900/148* (2013.01)

(58) Field of Classification Search
USPC ......... 290/1 R, 50; 417/415; 16/79; 318/466
See application file for complete search history.

(56) References Cited

U.S. PATENT DOCUMENTS

| | | | | | |
|---|---|---|---|---|---|
| 4,276,003 | A | * | 6/1981 | Perkins | E21B 21/01 184/24 |
| 4,551,072 | A | * | 11/1985 | Barall | F04B 53/10 137/595 |
| 4,660,250 | A | * | 4/1987 | Tillman | E05F 1/006 16/58 |
| 4,836,497 | A | * | 6/1989 | Beeson | F16K 31/04 137/315.03 |
| 4,967,444 | A | * | 11/1990 | Korling | E05F 3/223 16/48.5 |
| 4,999,872 | A | * | 3/1991 | Jentsch | E05F 3/102 16/58 |
| 5,027,909 | A | * | 7/1991 | Carter | B23K 11/314 173/52 |
| 5,417,011 | A | * | 5/1995 | Keszthelyi | E05F 15/49 49/28 |
| 5,493,882 | A | * | 2/1996 | Jasper | G07C 9/00912 70/278.4 |
| 5,553,472 | A | * | 9/1996 | Jasper | G07C 9/00912 70/278.4 |

(Continued)

*Primary Examiner* — Pedro J Cuevas
(74) *Attorney, Agent, or Firm* — Steven M. Shape; Dennemeyer & Associates, LLC

(57) ABSTRACT

The drive according to the invention for a wing of a door, a window or the like comprises a housing, a drive shaft supported rotatably in the housing, and a piston that interacts with the drive shaft and is guided slidably in the housing. In addition, the drive comprises energy conversion means interacting with the piston, by which energy from the movement of the piston can be converted to electrical energy, and electrical energy produced in this way can be converted back to mechanical energy, to supply at least one electrical component with electric current, to generate a braking torque and/or to drive the piston, especially to support the closing and/or opening movement.

17 Claims, 6 Drawing Sheets

(56) References Cited

U.S. PATENT DOCUMENTS

Figure 1:
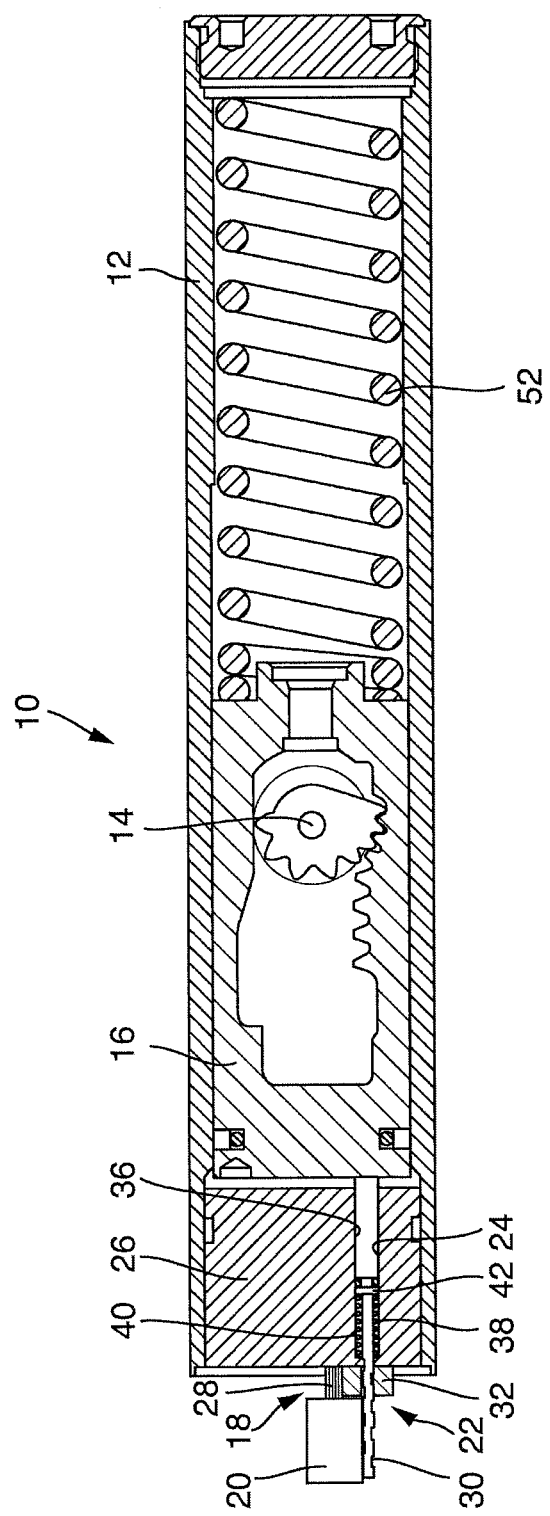

| Patent No. | | Date | Inventor | Classification |
|---|---|---|---|---|
| 5,687,507 A | * | 11/1997 | Beran | E05F 15/70 49/339 |
| 5,850,671 A | * | 12/1998 | Kaser | E05F 3/223 16/79 |
| 5,862,630 A | * | 1/1999 | Krumhauer | E05F 3/102 49/340 |
| 6,151,753 A | * | 11/2000 | Salutzki | E05F 3/10 16/49 |
| 6,236,118 B1 | * | 5/2001 | Vasija | F03G 1/02 290/1 E |
| 6,289,643 B1 | * | 9/2001 | Bonar | E06B 3/4654 49/505 |
| 6,412,224 B1 | * | 7/2002 | Feucht | E05F 3/10 49/333 |
| 6,481,160 B1 | * | 11/2002 | Kowalczyk | E05F 3/224 49/333 |
| 6,494,067 B1 | * | 12/2002 | Jasper | G07C 9/00912 70/278.1 |
| 7,137,595 B2 | * | 11/2006 | Barba | B64C 1/1407 244/129.5 |
| 7,303,167 B2 | * | 12/2007 | Barba | B64C 1/1407 188/171 |
| 7,522,042 B2 | * | 4/2009 | Milo | E05B 47/02 292/251.5 |
| 7,571,515 B2 | * | 8/2009 | Fischbach | E05F 3/102 16/64 |
| 7,795,746 B2 | * | 9/2010 | Riley | H02K 7/1853 290/1 R |
| 7,966,771 B2 | * | 6/2011 | Bienek | E05F 3/104 49/137 |
| 8,152,492 B2 | * | 4/2012 | Beck | F04B 47/02 417/415 |
| 8,225,458 B1 | * | 7/2012 | Hoffberg | E05F 3/102 16/49 |
| 8,291,644 B2 | * | 10/2012 | Plavnik | E05F 15/49 49/340 |
| 8,415,902 B2 | * | 4/2013 | Burris | E05F 3/102 16/52 |
| 8,527,101 B2 | * | 9/2013 | Burris | E05F 3/102 16/71 |
| 8,547,046 B2 | * | 10/2013 | Burris | E05F 3/227 16/49 |
| 8,564,235 B2 | * | 10/2013 | Burris | E05F 3/22 318/400.37 |
| 8,600,567 B2 | * | 12/2013 | Copeland, II | E05F 3/12 700/282 |
| 8,773,237 B2 | * | 7/2014 | Burris | G05B 19/0426 16/49 |
| 8,779,713 B2 | * | 7/2014 | Burris | E05F 3/22 318/264 |
| 8,966,712 B1 | * | 3/2015 | Yu | E05F 3/02 16/66 |
| 8,994,198 B2 | * | 3/2015 | Tsivicos | H02K 7/1853 290/1 R |
| 9,045,927 B1 | * | 6/2015 | Hoffberg | E05F 3/102 |
| 9,080,358 B2 | * | 7/2015 | Graf | E05D 11/0081 |
| 9,121,217 B1 | * | 9/2015 | Hoffberg | E05F 3/102 |
| D744,315 S | * | 12/2015 | Hasegawa | D8/330 |
| 9,325,221 B2 | * | 4/2016 | Tsivicos | H02K 7/1853 |
| 9,399,884 B2 | * | 7/2016 | Copeland, II | E05F 3/12 |
| 9,431,927 B2 | * | 8/2016 | Hoff | H01L 41/083 |
| 9,501,047 B2 | * | 11/2016 | Salutzki | E05F 3/224 |
| 9,523,230 B2 | * | 12/2016 | Burris | E05F 3/102 |
| 9,689,251 B2 | * | 6/2017 | Peterson | E21B 28/00 |
| 9,748,871 B2 | * | 8/2017 | Hoff | H02N 2/18 |
| 2002/0104266 A1 | * | 8/2002 | Ranaudo | G05B 19/042 49/334 |
| 2003/0005639 A1 | * | 1/2003 | Kowalczyk | E05F 3/224 49/340 |
| 2006/0242908 A1 | * | 11/2006 | McKinney | E05F 15/60 49/280 |
| 2009/0093913 A1 | * | 4/2009 | Copeland, II | E05F 3/12 700/282 |

* cited by examiner

DRIVE FOR A DOOR OR WINDOW WING

The invention relates to a drive for a wing of a door, a window or the like, with a housing, a drive shaft supported rotatably in the housing, and a piston that interacts with the drive shaft and is guided slidably in the housing.

The previously known drives of the initially mentioned type include hydraulic drives such as door closers with a working piston guided slidably in a housing, acted upon in the closing direction by a spring unit, said piston interacting with a drive shaft. The drive may optionally be connected to one wing of the door or to the fixed frame.

In the previously usual hydraulic drives or door closers, in which the housing is filled with a damping medium and the working piston is acted upon by a spring unit, the spring unit is compressed during a rotary movement of the drive shaft upon opening the wing, so that it can serve as an energy store for autonomous closure of the wing. As a rule, the interior space of the housing is divided into several chambers by the working piston. Between these chambers, in the case of the previously usual hydraulic drives or door closers, channels with assigned regulating valves are disposed for influencing the damping medium flowing back and forth between the chambers of the housing, serving to control the drive behavior.

The hydraulic components needed in the previously usual drives or door closers for controlling the drive behavior are relatively complex, which results in correspondingly high manufacturing costs. If the drive is to be disposed on the door wing, up to now a door passage cable has been necessary additionally for supplying power to electrical components, wherein said cable must be laid from the frame to the door wing provided with the drive. In addition, it is often necessary for appropriate lines first to be laid for the required power connection. The supply of power to any electric components present is also associated with relatively high costs, at least if they are to be disposed on the door wing.

The invention is based on the task of specifying a drive of the initially mentioned type with which the above-mentioned drawbacks are eliminated. With this, using the simplest possible design and correspondingly cost-advantageous manufacturing simpler and more variable control of the drive behavior and easier supply of the electrical component with electric current is to be guaranteed.

The task is accomplished according to the invention with a mechanism having the features of claim 1. Preferred embodiments of the mechanism according to the invention arise from the subclaims, the description below and the drawing.

The drive according to the invention for a wing of a door, a window or the like comprises a housing, a drive shaft supported rotatably in the housing, and a piston that interacts with the drive shaft and is guided slidably in the housing. According to the invention, the drive with the energy conversion means interacting with the piston, by which energy from the movement of the piston can be converted to electrical energy, and electrical energy produced in this way can be converted back to mechanical energy, in order to supply at least one electrical component with electric current, to generate a braking torque and/or to drive the piston, especially to support the closing and/or opening movement.

Using this design, with a simpler configuration and correspondingly more cost-advantageous manufacturing, in particular, simpler and more versatile control of the drive behavior as well as easy supply of the electrical components possibly included with electric current is to be guaranteed.

The hydraulic components previously required especially for damping the closing movement of the wing can be dispensed with. Now it is also possible, for example, to influence or control the damping of the wing movement electrically. The electrical energy generated by the energy conversion means during the opening and/or closing of the wing can especially be used to supply at least one electrical component with electric current, to generate a braking torque and/or to drive the piston block at least in sections to support the closing and/or opening movement. In the latter case the electrical energy, stored temporarily if desired, may be used for example to strengthen the closing force. The energy conversion means now makes possible a self-contained power supply for the drive, so that the power connection previously required can be dispensed with. Thus, for this reason as well, additional installation costs are no longer necessary.

Preferably the energy conversion means comprise an electrical generator/motor unit that can be operated as both a generator and a motor, as well as a gear drive over which the piston block is coupled with the electrical generator/motor unit.

In generator operation, for example, a rotor of the electrical generator/motor unit can be mechanically driven via the piston block, so that electric power is stored in the coils of the stator of the electrical generator/motor unit. With this, during generator operation, at least one electrical component can be directly supplied with power. To supply a given electrical component with current, electrical energy previously generated by the generator/motor unit and stored temporarily may also be used. If, for example, current is conducted over a bypass back to the generator/motor unit, this creates a braking torque that is transmitted over the piston, so that the wing can be electrically damped. Temporarily stored electrical energy can also be used to drive the motor and, for example, to support the opening movement when the wing is being opened. With a corresponding increase in the closing force, for example, it is possible to ensure that the wing is reliably closed.

According to an advantageous practical embodiment of the drive according to the invention, the gear drive comprises a push rod supported slidably in the housing in the direction of movement of the piston, said push rod being slidable with the piston and via which the translational movement of the piston can be converted to a rotational movement.

Advantageously the push rod is slidably supported in a housing cover or end wall provided at one end of the housing. In this case, it is especially advantageous if the push rod extends through the housing cover or end wall and is held in engagement or is engaged with the piston projecting toward the inside from the housing cover or end wall and around its end wall projecting to the outside from the housing cover or end wall, is coupled with a drive shaft or output shaft of the electrical generator/motor unit.

According to an advantageous practical embodiment of the drive according to the invention, the push rod projecting toward the outside from the housing cover or end wall is provided with a threaded shaft, which works together with a spindle nut provided with external threading, over which the push rod is coupled with the generator/motor unit.

According to an alternative advantageous embodiment, the push rod around its end projecting to the outside from the housing cover or end wall is designed as, is coupled with a toothed rack over which the piston is coupled with the drive shaft or output shaft of the electrical generator/motor unit.

According to an advantageous practical embodiment of the drive according to the invention, the push rod is acted upon by spring force in the direction of the piston and thus kept in engagement with this.

If the piston, during opening of the wing, is moved away from the housing cover or end wall in question, the push rod pressed elastically against the piston is made to follow the piston by spring force and kept in contact with it. The push rod need only be axially slidable and not rotatable. With a respective displacement of the push rod, over the threaded shaft or the toothed rack at least one additional drive element, for example the spindle nut placed on the toothed rack or a gear wheel meshing with the toothed rack, is set into rotation and the rotational movement is transferred to the generator/motor unit and vice-versa. Thus, power can be generated during opening and closing of the wing and can be used for driving electrical components. If, for example, current is conducted over a bypass back to the generator/motor unit, the motor creates a braking torque that is transmitted over the mechanical system to the piston, so that the drive or door closer can be electrically damped.

If the push rod is acted upon by spring force in the direction of the piston, the push rod is advantageously slidably supported in a stepped bore in the housing cover or end wall of the housing and acted upon in the direction of the piston by a spring unit disposed in the bore, said spring unit on one hand being braced on an interior step of the stepped bore and on the other hand, on a radial projection or collar of the push rod.

According to an advantageous alternative embodiment, the push rod may also be permanently connected to the piston around its end facing the piston. In this case, the push rod is preferably connected to the piston in a form-fit and/or friction-locked manner.

With such a firm, for example form-fit and/or friction-locked connection of the push rod with the piston, electrical damping is possible in both directions. In this case, a spring unit acting on the push rod is not necessary, making a more compact structure possible.

For temporarily storing the electrical energy generated by the energy conversion means, an energy storage unit of any desired type and/or a rechargeable electrical energy storage unit, for example a capacitor, a battery pack and/or the like may be provided. As was previously mentioned, the temporarily stored electrical energy can be used, for example, to drive the motor and to support the opening or closing movement of the wing during its opening or closing. Alternatively, or additionally, the temporarily stored electrical energy can also serve for supplying any desired electrical components with electric current.

It is also especially advantageous if the electric generator/motor unit comprises a gear drive motor/generator. Correspondingly, the generator/motor unit can comprise a combination of a generator/motor unit that can also be operated as a motor and a gear drive.

It is also particularly advantageous if the gear drive is made such that in at least one direction of movement of the wing, free-wheeling occurs in a section between the sliding block and the energy conversion means.

According to an additional preferred practical embodiment of the mechanism according to the invention, this comprises an electronic control unit, over which the electrical generator/motor unit and/or at least one other component can be actuated.

Advantageously the electrical generator/motor unit can be actuated over the electronic control unit to influence the closing and/or opening movement of the wing. It is also advantageously possible to actuate an electrically controlled valve that holds the wing in one position, e.g., the open position, wherein if needed it is also possible to provide that the wing can be closed again by actuating a timer that acts on the valve after a set time. The valve may be of bistable or monostable design.

According to a preferred practical embodiment of the drive according to the invention, the piston rod is acted upon by a spring unit in the closing direction.

Figure 2:
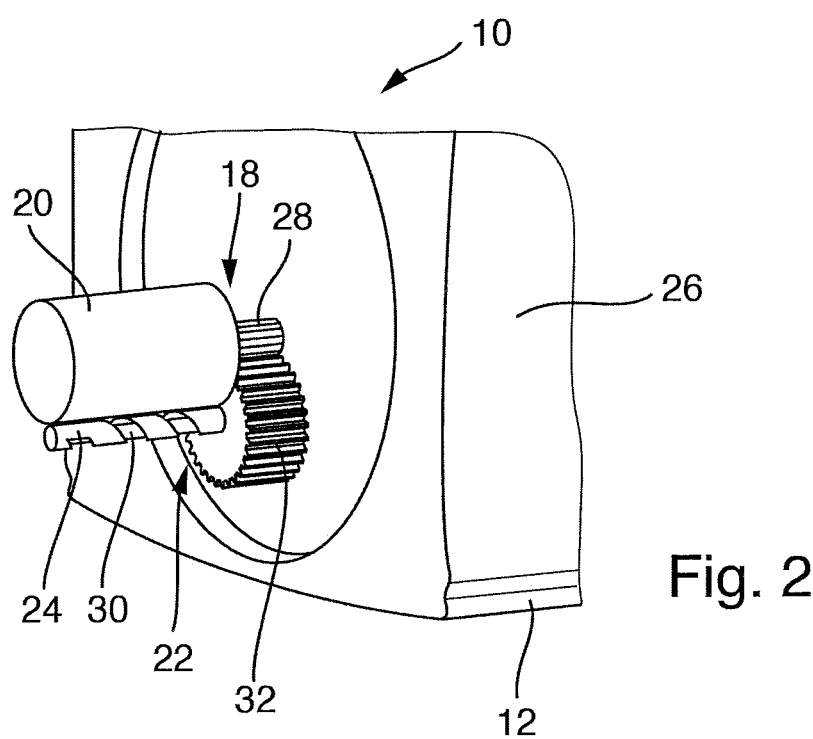
Figure 3:
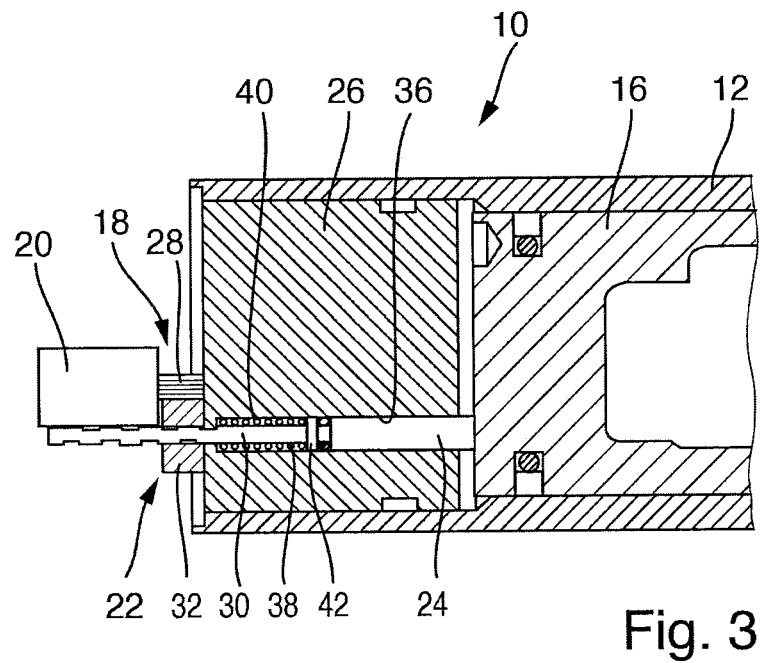
Figure 4:
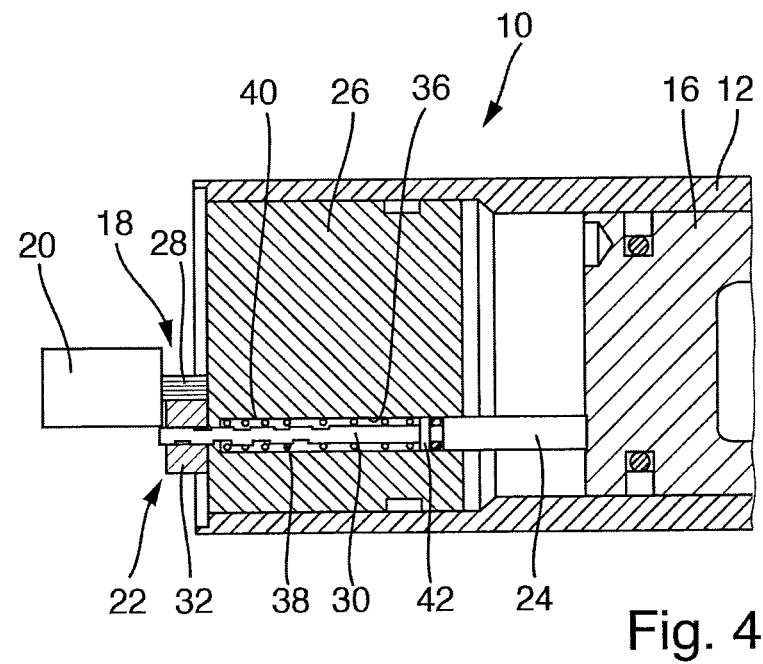
Figure 5:
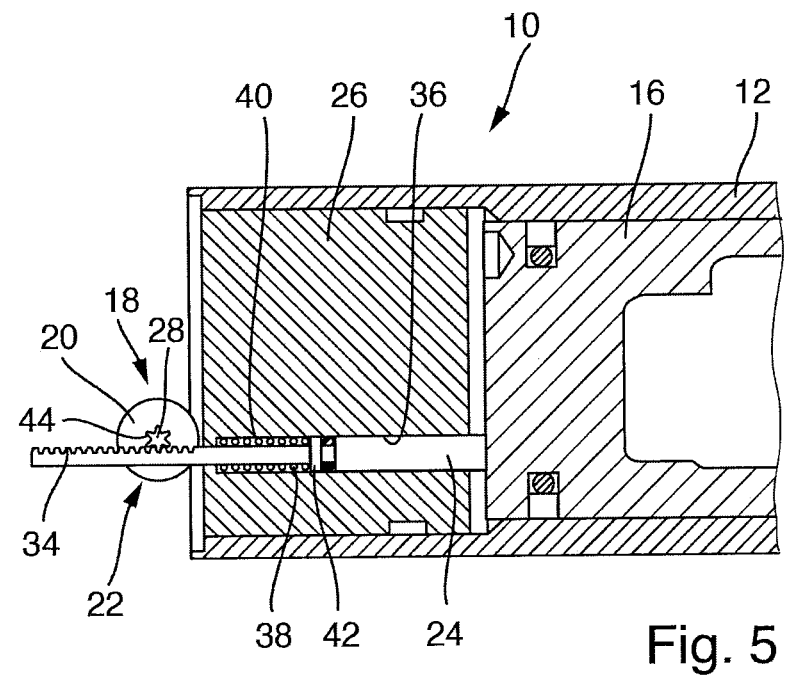
Figure 6:
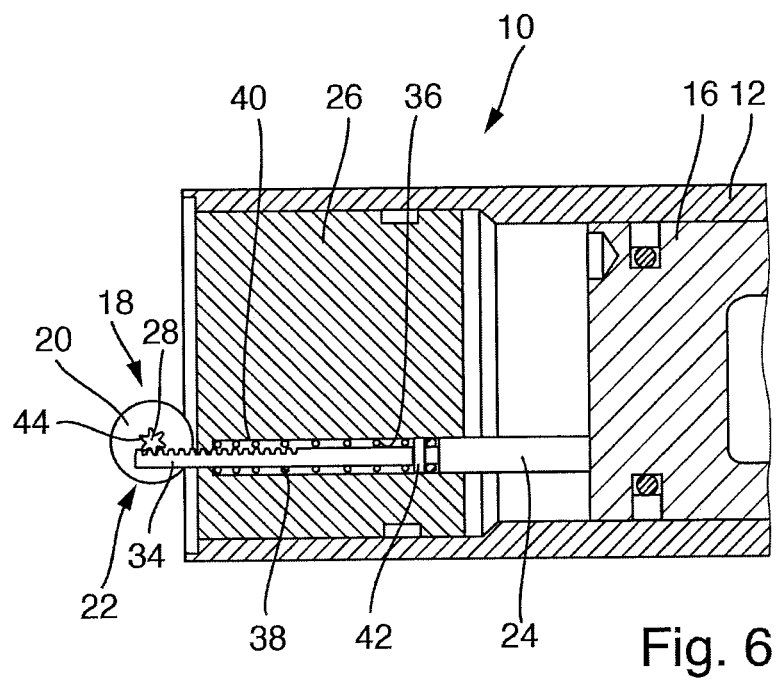
Figure 7:
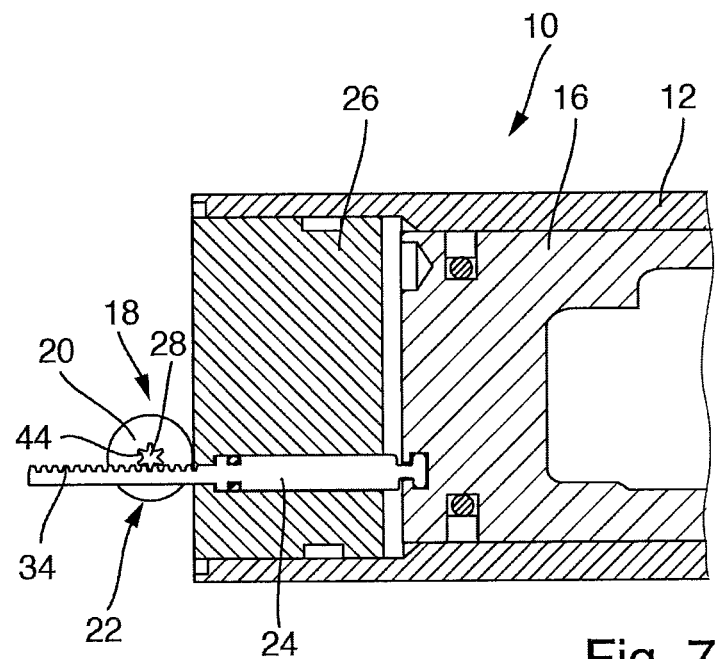
Figure 8:
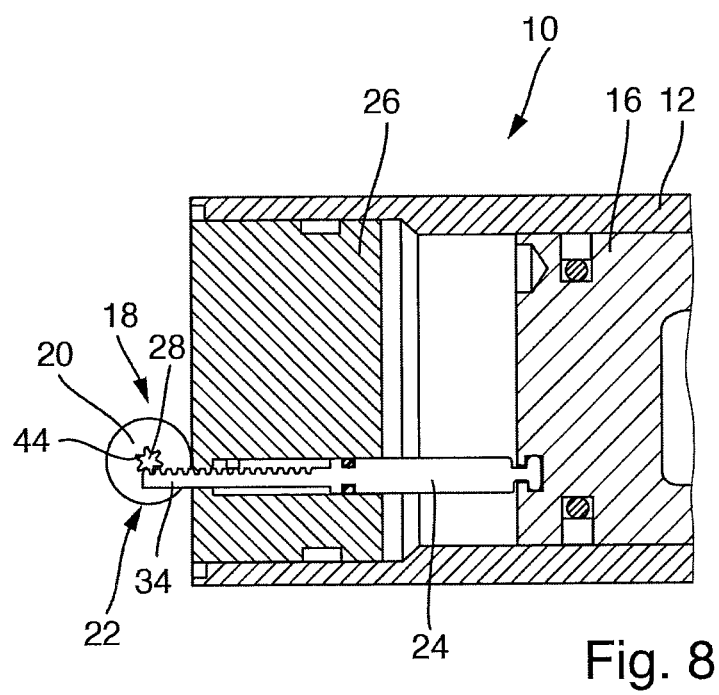
Figure 9:
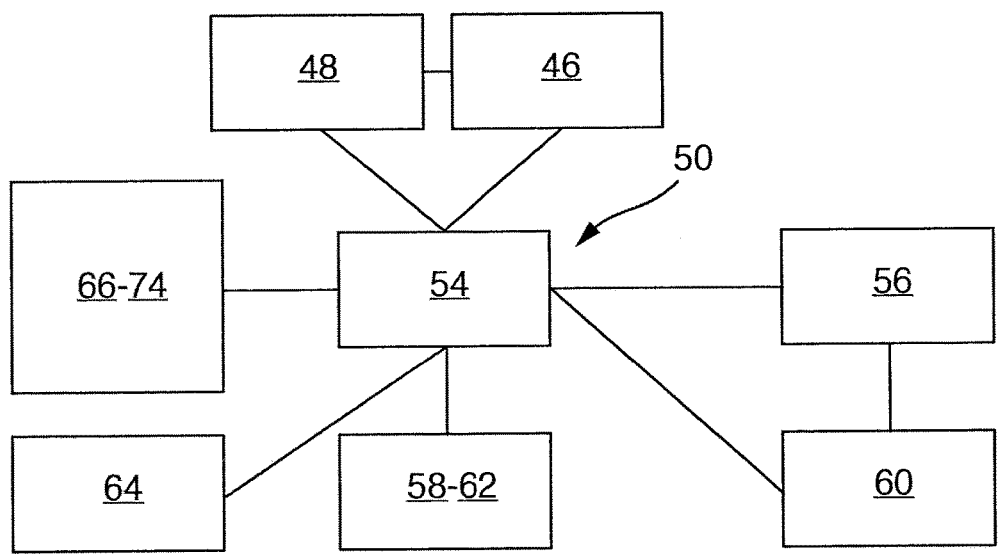

In the following, based on exemplified embodiments, the invention will be explained in further detail regarding the drawing; this shows the following:

FIG. 1 A schematic, sectional representation of an exemplified embodiment of a drive according to the invention, in which the push rod provided between the piston and the generator/motor unit is provided with a threaded shaft and is acted upon by a spring unit in the direction of the piston, FIG. 2 a schematic perspective front view of the drive according to FIG. 1, FIG. 3 a schematic, sectional partial view of the mechanism according to FIG. 1 with its piston occupying a closed position, FIG. 4 a schematic, sectional partial view of the mechanism according to FIG. 1 with its piston moved into the open position, FIG. 5 A schematic, sectional partial view of an additional exemplified embodiment of a drive according to the invention, in which the push rod provided between the piston and the generator/motor unit is provided with a toothed rack shaft and is acted upon by a spring unit in the direction of the piston, wherein the piston occupies its closed position, FIG. 6 a schematic, sectional partial view of the mechanism according to FIG. 5 with its piston moved into the open position, FIG. 7 A schematic, sectional partial view of an additional exemplified embodiment of a drive according to the invention, in which the push rod provided between the piston and the generator/motor unit is provided with a toothed rack shaft and is connected to the piston in a form-fit and/or friction-locked manner, wherein the piston occupies its closed position, FIG. 8 a schematic, sectional partial view of the mechanism according to FIG. 7 with its piston moved into the open position, and FIG. 9 a schematic representation of an exemplified embodiment of the electronic control unit of the device according to the invention.

FIGS. 1 to 9 show schematic representations of various exemplified embodiments of a drive 10 according to the invention for a wing of a door, a window or the like.

With this, the drives 10 in each case comprise a housing 12, a drive shaft 14 supported rotatably in the housing 12, and a piston 16 that interacts with the drive shaft 14 and is guided slidably in the housing 12.

In addition, the drives 10 with the energy conversion means 18 interacting with the piston 16, by which energy from the movement of the piston 16 can be converted to electrical energy, and electrical energy produced in this way can be converted back to mechanical energy, in order to supply at least one electrical component with electric current, to generate a braking torque and/or to drive the piston 16, especially to support the closing and/or opening movement.

Preferably the energy conversion means 18 comprise an electrical generator/motor unit 20 that can be operated as both a generator and a motor, as well as a gear drive 22 over which the piston 16 is coupled with the electrical generator/motor unit 20.

The gear drive 22 comprises a push rod 14 supported slidably in the housing 12 in the direction of movement of the piston 16, slidable with the piston 16 and via which the translational movement of the piston 16 can be converted to a rotational movement.

The push rod 24 in each case can be slidably supported in a housing cover or end wall 26 provided at one end of the housing 12. In this case it is especially advantageous if the push rod 24 extends through the housing cover or end wall 26 and is held in engagement or is engaged with the piston 16 with an end projecting from the housing cover or end wall 26 and in the area of its end wall 26 projecting to the outside is coupled with an output and/or drive shaft 28 of the electrical generator/motor unit 20.

In the exemplified embodiments of the drive 10 according to the invention shown in FIG. 1 to 4, the push rod 24 in the area of its end projecting toward the outside from the housing cover or end wall 26 is in each case provided in its area of its end projecting toward the outside from the housing cover or end wall 26 is provided with a threaded shaft 30, which cooperates with a spindle nut 32 provided with external threading, over which the push rod 24 is coupled with the output and/or drive shaft 28 of the generator/motor unit 20.

In contrast, FIGS. 5 to 8 show two different exemplified embodiments of the drive 10 according to the invention, in which the push rod 24 around its end projecting toward the outside from the housing cover or end wall 26 is designed as a toothed rack 34, over which the push rod 24 is coupled with the drive shaft and/or output shaft 28 of the electrical generator/motor unit 20.

According to the exemplified embodiments of the drive 10 shown in FIG. 2 to 6, the push rod 24 in each case is acted upon by spring force in the direction of the piston 16 and thus kept in engagement with this.

With this, the push rod 24 as shown, for example, can be supported slidably in a stepped bore 36 of the housing cover or end wall 26 of the housing 12 and acted upon in the direction of the piston 16 by a spring unit 38 disposed in the bore 36, said spring unit on one hand being braced on an interior step 40 of the stepped bore 36 and on the other hand, on a radial projection or collar 42 of the push rod 24.

In contrast, FIGS. 7 and 8 show an exemplified embodiment of the drive 10, in which the push rod 24 is permanently connected to the piston 16 around its end facing the piston 16. In this case, the push rod 24 is preferably connected to the piston 16 in a form-fit and/or friction-locked manner around its end facing the piston 16.

During opening of the wing, the piston 16 of a respective drive 10 in the representations according to FIGS. 1 and 3 to 8 is moved to the right in each case. Here, In the exemplified embodiments according to FIG. 1 to 6, the spring unit 38 presses the push rod 24 against the piston 16. The push rod 24 must only be axially movable and not rotatable. With a respective movement of the piston 16, the push rod 24 is also correspondingly slid along with it. In this case, via the threaded spindle 30, the spindle nut 32 (see FIGS. 1 to 4) or over the toothed rack 34, for example, a gear or sprocket 44 connected to the output shaft and/or drive shaft 28 of the generator/motor unit 20 (see FIGS. 7 and 8) is set into rotation, by which means the rotary movement is transferred to the generator/motor unit 20. When the wing is being closed, the piston 16 presses the push rod 24 to the left. Thus, power can be generated during opening and/or closing of the wing and can be used, for example, for operating electrical components. If the power is transferred over a bypass back into the generator/motor unit 20 operated as a motor, the motor produces a braking torque that is transferred over mechanical system to the piston 16, so that the drive 10 or door closer can be electrically damped. If the push rod 24, as shown in the embodiment according to FIGS. 7 and 8 is tightly connected with the piston 16, electrical damping is possible in both directions. In this case, the spring unit 38 is not necessary.

For temporarily storing the electrical energy generated by the energy conversion means 18, an energy storage unit 46 of any desired type and/or a rechargeable electrical energy storage unit 48, for example a capacitor, a battery pack and/or the like may be provided.

The temporarily stored electrical energy can be used, for example, to drive the generator/motor unit 20 as a motor and to support the opening or closing movement of the wing during its opening or closing. Alternatively, or additionally, the temporarily stored electrical energy can also serve for supplying any desired electrical components with electric current.

The electrical generator/motor unit 20 can for example comprise a gear drive motor/generator. A generator/motor unit of this type comprises a combination of a generator/motor unit that can be operated as both a generator and a motor and a gear drive.

In addition, in each case the drives can also comprise an electronic control unit 50, over which the electrical generator/motor unit 20 and/or at least one other component can be actuated.

In this case, the electrical generator/motor unit 20 can be actuated over the electronic control unit 50 to influence the closing and/or opening movement of the wing.

As is particularly apparent from FIG. 1, the piston 16 of the drive 10 can in each case be acted upon by a spring unit 52 in the closing direction.

The gear drive 22 can be designed in such a manner, and/or the electric motor/generator unit 20 can be actuated by the electronic control unit 50 in such a manner that in at least one movement direction of the wing, freewheeling takes place in sections between the piston 16 and the energy conversion means 18.

Through corresponding actuation of the electric generator/motor unit 20 via the electronic control unit 40, the drive behavior, especially the closing time characteristics, strengthening of the closing force or the like, can be controlled in the desired manner.

For example, the electronic control unit 50 can comprise at least one microcontroller 54. For example, it can be connected to at least one rotary pulse generator 56, at least one scanner 58, at least one switch 60, at least one sensor 62 and/or the like (see FIG. 9). Here, the respective connection may be wired and/or wireless.

Alternatively, or additionally, at least one communication interface 64 for wired and/or wireless communication may be connected to a respective electronic control unit 50 (again see FIG. 9). Furthermore, the electronic control unit 50 can relate to at least one scanner provided on a controller or the like, and/or communicate with at least one peripheral unit over a NFC or near-field communication connection and/or a Bluetooth connection and/or the like.

Through the energy conversion means 18, as respective electrical components, for example, power can be supplied to at least one electronic control unit 50, at least one electrical valve 66 assigned to the drive, at least one sensor 68, at least one signal generator 70, at least one optical generator and/or at least one acoustic signal generator, at least one lighting element 72, an electrical drive unit 74 assigned to the drive and/or the like (again see FIG. 9).

The design according to the invention enables, using a relatively simple assembly and correspondingly cost-advantageous manufacturing easy and versatile control of the drive behavior, in that it can be at least partially influenced electrically. Through the energy conversion means 18 integrated in the drive 10 it is possible both to generate energy for powering components and to dissipate energy from the drive or door closer to accomplish electrical damping. Thus, the hydraulic components previously required for damping the drive or door closer can be dispensed with. It is now possible, among other things, to control closing time sequences electrically and/or to utilize the energy conversion means 18 as a drive for increasing and/or strengthening the closing force.

The respective implementation and execution of the gear drive 22 can be adapted to the respectively existing force relationships. In the gear drive 22, for example, freewheeling is also possible, especially in one direction. The piston 16 is slid during opening and/or closing of the wing. During sliding of the piston 16, the rotary movement is transferred over the said gear drive 22 to the electrical generator/motor unit 20, which can also be operated as a motor, over this energy conversion unit 18. If the power is transferred over a bypass back into the generator/motor unit 20 operated as a motor, the motor produces a braking torque that is transferred over the gear drive 22, and the piston 16 to the drive, so that the drive or door closer, for example, can be electrically damped.

The electrical energy generated by the energy conversion means 18 can also be temporarily stored. Therefore, among other things, the stored energy can also be used to drive the motor and to support the opening and/or closing movement of the wing. For reliable closing of the wing, the closing force can be increased appropriately via the motor.

With the electrical energy generated via the energy conversion means 18, for example, the electronic control unit 50 or the microcontroller thereof 54 can supply electric components 66 to 74 or consumers such as electrical valves, signal generators, illumination elements and/or the like with power. Pulse generators, scanners and/or the like can supply the electronic control unit 50 or its microcontroller 54, for example, with information on the status of the drive or door closer. If the energy conversion means 18, for example, are used for damping, closing and/or the like of the wing, the electronic control unit 50 or the microcontroller thereof 54 can adjust the motor performance individually as needed. Over at least one interface, the electronic control unit 50 or the microcontroller thereof 54 can exchange and/or obtain information and/or instructions to and/or from assigned components.

LIST OF SYMBOLS

10 Drive
12 Housing
14 Drive shaft
116 Piston
18 Energy conversion means
20 Generator/motor unit
22 Gear drive
24 Push rod
26 Housing cover, end wall
28 Output and/or drive shaft.
30 Threaded spindle
32 Spindle nut
34 Toothed rack
36 Bore
38 Spring unit
40 Interior step
42 Radial projection, collar
44 Gear wheel, sprocket
46 Energy storage unit
48 Rechargeable energy storage unit
50 Electronic control unit
52 Spring unit
54 Microcontroller
56 Rotary pulse generator
58 Scanner
60 Switch
62 Sensor
64 Communication interface
66 Electric valve
68 Sensor
70 Signal generator
72 Illumination element
74 Electric drive unit

The invention claimed is:

1. A drive (10) for opening or closing a wing of a door, a window or the like, comprising a housing (12), a drive shaft (14) supported rotatably in the housing (12), a piston (16) cooperating with the drive shaft (14) and guided slidably in the housing (12), and an energy converter 18 positioned external to the housing (12), wherein the drive (10) cooperates with the piston (16) which is mechanically connected to energy converter (18) to convert energy from mechanical movement of the piston (16) into electrical energy and electrical energy into mechanical energy to supply at least one electrical component (50, 54, 66-74) with electric current and to generate a braking torque or to drive the piston (16) to assist in opening or closing of the wing of the door, the window or the like.

2. The drive according to claim 1, wherein the energy converter (18) comprises an electrical generator/motor unit (20) operable as both a generator and a motor, and includes a gear drive (22) over which the piston (16) is coupled with the electrical generator/motor unit (20).

3. The drive according to claim 2, wherein the gear drive (22) comprises a push rod (24) having a first end and second end supported in the housing (12) and is movable in the direction of movement of the piston (16), and wherein drive gear (22) is movable with the piston (16) such that movement of piston (16) coverts translational movement of piston (16) into rotational movement of gear drive (22).

4. The drive according to claim 3, further comprising a housing cover and an end wall (26) at one end of housing (12), wherein the push rod (24) is slidably supported in the housing cover or end wall (26).

5. The drive according to claim 4, wherein the push rod (24) extends through the housing cover or end wall (26) and is held in engagement with the piston (16) at the first end of push rod (24) and is coupled with an output and/or drive shaft (28) of the electrical generator/motor unit (20) at a second end of push rod (24).

6. The drive according to claim 5, wherein the first end of the push rod (24) includes a threaded shaft (30), which cooperates with a spindle nut (32) which includes an external thread, over which the push rod (24) is coupled with the output shaft and/or drive shaft (28) of the generator/motor unit (20).

7. The drive according to claim 5, wherein the second end of the push rod (24) includes a toothed rack (34), over which the push rod (24) is coupled with the output shaft and/or drive shaft (28) of the electrical generator/motor unit (20).

8. The drive according to claim 2, wherein the push rod (24) is acted upon by spring force in the direction of the piston (16) such that the push rod (24) maintains engagement with the piston (16).

9. The drive according to claim 8, further comprising a stepped bore (36) with an interior step (40), a spring unit (38) and a projection collar (42), wherein the push rod (24) is slidably supported in the stepped bore (36) of the housing cover or end wall (26) of the housing (12) and acted upon in the direction of the piston (16) by the spring unit (38) disposed in the bore (36), said spring unit (38) being braced on the interior step (40) of the stepped bore (36) and on the radial projection or collar (42) of the push rod (24).

10. The drive according to claim 1, wherein the push rod (24) is fastened tightly to the piston (16).

11. The drive according to claim 10, wherein the push rod (24) is connected to the piston (16) in a form-fit or friction-locked manner.

12. The drive according to claim 1, further comprising an energy storage unit (46) or a rechargeable electrical energy storage unit (48) for temporarily storing the electrical energy generated by the energy converter (18).

13. The drive according to claim 1, wherein the electrical generator/motor unit (20) comprises a gear drive motor/generator.

14. The drive according to claim 1, further comprising an electronic control unit (50) for actuation of the electrical generator/motor unit (20).

15. The drive according to claim 14, wherein actuation of the electrical generator/motor unit (20) through the electronic control unit (50) controls movement of the door wing, window or the like.

16. The drive according to claim 1, further comprising a spring unit (52), wherein the piston (16) is acted upon by the spring unit (52) in the closing direction.

17. The drive according to claim 12, wherein the energy storage unit (46) and the rechargeable electrical energy storage unit (48) is each one of a capacitor or a battery pack.

* * * * *